Sept. 20, 1927.  
C. BODMER ET AL  
1,642,986  
HAND DRILL  
Filed Nov. 9, 1925
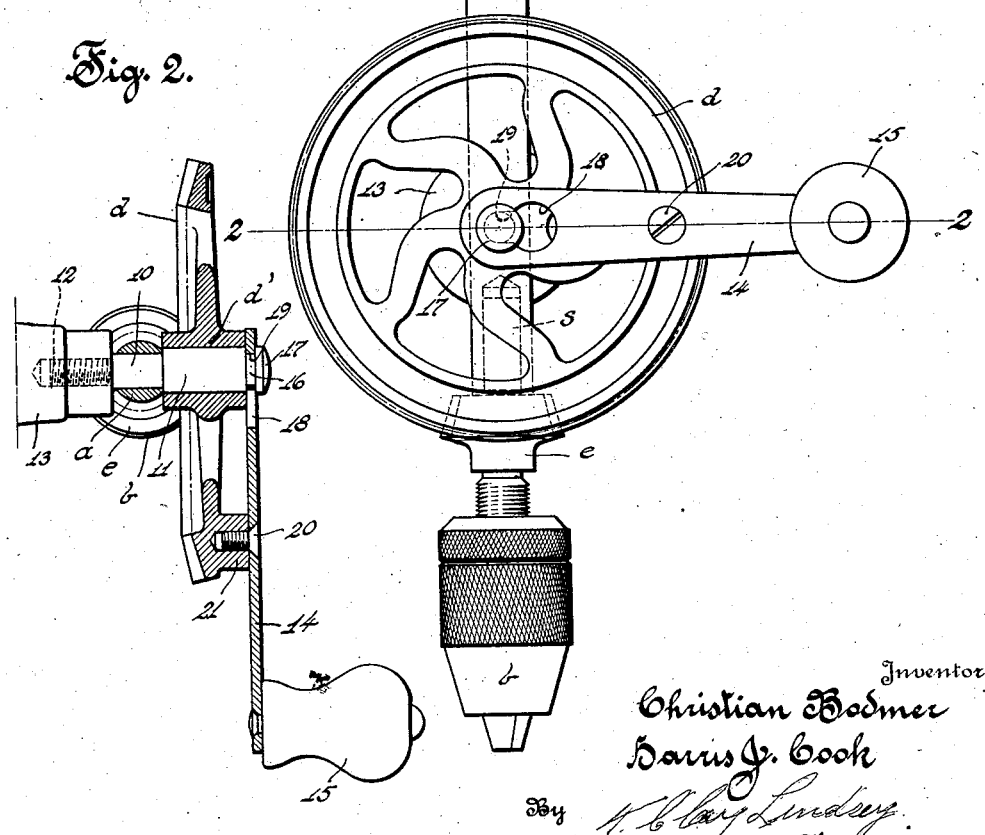

Patented Sept. 20, 1927.

1,642,986

UNITED STATES PATENT OFFICE.

CHRISTIAN BODMER AND HARRIS J. COOK, OF NEW BRITAIN, CONNECTICUT, ASSIGNORS TO THE STANLEY WORKS, OF NEW BRITAIN, CONNECTICUT, A CORPORATION OF CONNECTICUT.

HAND DRILL.

Application filed November 9, 1925. Serial No. 67,728.

The present invention relates to hand drills of the type having a body portion or frame, a spindle journalled therein, and a gear for driving said spindle and provided with a handle for turning the same.

The aim of the invention is to provide a simple and economical arrangement wherein the driving gear and the handle for turning the same may be very readily assembled and disassembled and effectively secured in assembled relation.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings:

Figure 1 is an elevational view of our improved drill; and

Fig. 2 is a sectional view taken substantially on line 2—2 of Fig. 1.

Referring to the drawings in detail, $a$ denotes the frame or body portion which is in the form of a shank in one end of which is journalled a spindle $s$ provided with the usual chuck $b$. On the outer end of the body portion or shank is a hand grip $c$. Projecting laterally from the body portion is a bearing on which is journalled a driving gear $d$ meshing with a pinion $e$ fixed to the spindle.

The bearing for the drive gear $d$ is provided on a stem 10 which projects through, and has a driving fit in, a diametrical opening in the shank $a$. One end of this stem is enlarged to provide the bearing 11. The other end of the stem is threaded as at 12, and onto this threaded portion a laterally extending hand grip 13 is adapted to be screwed. The handle for turning the gear $d$, in the present illustrative disclosure, includes a metal arm 14 and a knob 15 on the outer end of the arm.

The gear $d$ is secured on the bearing 11 by the handle, and the handle is held in place in the following manner. The support for the gear $d$ projects beyond the plane of the gear and is provided with a circumferential groove 16 and a head 17. The arm 14 is provided, adjacent its inner end, with an opening having a circular portion 18 of slightly greater diameter than the head 17 so that the head may be slipped through the opening. The opening also has a portion 19 of lesser diameter than the head 17 and of substantially the same diameter as that portion of the stem within the groove 16. The arm 14 is secured to the gear by means of a screw 20 threaded into a boss 21 of the gear.

To assemble the parts, the stem 10 is driven into place on the body portion and then the gear is slipped onto the bearing 11. The handle is then positioned over the stem with the enlarged portion 18 of the opening in registry with the head 17. The handle is then moved radially with respect to the gear to bring the reduced portion 19 of the slot or opening into engagement with the groove 16 and under or behind the head 17, as shown in the drawings. The screw 20 is then inserted through the handle arm and screwed into the boss 21 so as to hold the handle against rotary movement with respect to the gear and against endwise movement.

It will be seen that the stem 10 may be very economically manufactured in a screw machine, and the groove 16 may be formed at practically no additional expense. The length of the hub $d'$ of the gear and the thickness of the handle arm 14 are substantially equal to the distance between the body portion $a$ and the head 17, which means that, when the parts are assembled, the gear is locked against endwise or axial movement by the handle arm, and the handle arm is secured to the stem by the head 17. Preferably, the thickness of the handle arm 14 is equal to the width of the groove 16 so that the edge about the portion 19 of the opening will fit snugly in the groove. The stem 10 not only forms a bearing for the gear and a portion of the means for locking the handle and gear in place, but also serves as a support for the laterally extending hand grip 13.

From the foregoing description, taken in connection with the accompanying drawings, it will be clear that our improved drill comprises but a relatively few number of parts, the handle arm and the stem 10 may be very economically manufactured, and the parts may be very quickly assembled and, when they are assembled, they are securely held together in the proper relation.

We claim as our invention:

1. A hand drill having a body portion, a spindle journalled therein, a chuck on said spindle, a pinion on said spindle, a gear for driving said pinion, a fixed stud on said body portion and on which said gear is journalled, said stud having its outer end extending beyond said gear and provided with a circumferential groove, a handle having an arm provided with a portion adapted to engage in said groove whereby to hold said gear on said stud, and means for securing said handle against movement relative to said gear.

2. A hand drill having a body portion, a spindle journalled therein, a chuck on said spindle, a pinion on said spindle, a gear for driving said pinion, a stud projecting laterally from said body portion and on which said gear is journalled, said stud extending beyond said gear and having a circumferential groove, a handle having an arm provided with a slot with a portion adapted to slip over the outer end of said stud and with a second portion adapted to engage in said groove whereby to hold said gear on said stud, and a screw for securing said handle against movement relative to said gear.

3. A hand drill having a body portion, a handle on one end thereof, a spindle journalled in the other end thereof, a chuck on said spindle, a pinion on said spindle, a gear for driving said spindle, a stud having a driving fit in said body portion and provided with a bearing on which said gear is journalled, said stud extending beyond said gear and having a circumferential groove, a handle having an arm provided at one end with a slot, said slot having a portion adapted to slip over the end of said stud and a reduced portion engageable within said groove whereby to hold said gear on said stud, and means for securing said handle to said gear and against movement relative thereto.

CHRISTIAN BODMER.
HARRIS J. COOK.